(12) United States Patent
Kitamura et al.

(10) Patent No.: US 10,189,156 B2
(45) Date of Patent: Jan. 29, 2019

(54) INDUSTRIAL ROBOT

(71) Applicant: KAWASAKI JUKOGYO KABUSHIKI KAISHA, Kobe-shi, Hyogo (JP)

(72) Inventors: Shinji Kitamura, Kako-gun (JP); Masato Yamamoto, Kakogawa (JP); Koji Yoshino, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/552,477

(22) PCT Filed: Feb. 17, 2016

(86) PCT No.: PCT/JP2016/054531
§ 371 (c)(1),
(2) Date: Aug. 21, 2017

(87) PCT Pub. No.: WO2016/133105
PCT Pub. Date: Aug. 25, 2016

(65) Prior Publication Data
US 2018/0029223 A1 Feb. 1, 2018

(30) Foreign Application Priority Data
Feb. 20, 2015 (JP) ................. 2015-031499

(51) Int. Cl.
B25J 9/06 (2006.01)
B25J 9/10 (2006.01)
B25J 9/12 (2006.01)

(52) U.S. Cl.
CPC .............. B25J 9/06 (2013.01); B25J 9/1065 (2013.01); B25J 9/12 (2013.01); Y10S 901/23 (2013.01)

(58) Field of Classification Search
CPC .............. B25J 9/06; B25J 9/1065; B25J 9/12
See application file for complete search history.

(56) References Cited

U.S. PATENT DOCUMENTS 4,435,116 A * 3/1984 Van Deberg ............. B25J 9/046
414/718
4,637,773 A * 1/1987 Nakashima ............ B25J 9/1045
414/7
(Continued)

FOREIGN PATENT DOCUMENTS

JP S53-57480 U 5/1978
JP S60-44277 A 3/1985
(Continued)

OTHER PUBLICATIONS

May 17, 2016 International Search Report issued in International Patent Application No. PCT/JP2016/054531.
(Continued)

Primary Examiner — Zakaria Elahmadi
(74) Attorney, Agent, or Firm — Oliff PLC

(57) ABSTRACT

An arm unit of a robot has a lower arm mechanism including a parallel link structure and an upper arm mechanism. The lower arm mechanism has a front link and a rear link including respective lower ends rotatably connected to the base portion. A lower arm drive mechanism has a lower ball screw and a lower bearing portion supporting a shaft so as to be rotatable about its axis. An extending portion extending from the lower end of the rear link is connected to a nut so as to be rotatable about a nut side rotational axis. The lower bearing portion is connected to a base portion so as to be rotatable about a bearing portion side rotational axis. Thus, high mechanical rigidity can be ensured over a wide operation range under a high load condition.

8 Claims, 12 Drawing Sheets

(56) References Cited

U.S. PATENT DOCUMENTS

| | | | | |
|---|---|---|---|---|
| 4,662,813 | A | * | 5/1987 | Hartman .................. B25J 9/045 |
| | | | | 414/718 |
| 4,754,392 | A | * | 6/1988 | Nakashima .......... G05B 19/416 |
| | | | | 318/571 |
| 5,107,716 | A | * | 4/1992 | Torii .......................... B25J 9/02 |
| | | | | 384/296 |
| 5,634,376 | A | * | 6/1997 | Kitamura .................. B25J 9/02 |
| | | | | 414/729 |
| 5,814,960 | A | * | 9/1998 | Ookura .................... B25J 9/046 |
| | | | | 318/568.11 |
| 2003/0221504 | A1 | * | 12/2003 | Stoianovici ................ B25J 9/06 |
| | | | | 74/490.04 |
| 2006/0201275 | A1 | * | 9/2006 | Ono ....................... B25J 9/1025 |
| | | | | 74/490.01 |
| 2007/0110555 | A1 | * | 5/2007 | Ono ....................... B25J 9/1065 |
| | | | | 414/744.5 |
| 2008/0246428 | A1 | * | 10/2008 | Shimada .................... B25J 9/06 |
| | | | | 318/568.11 |
| 2010/0185211 | A1 | * | 7/2010 | Herman ................. B25J 9/1065 |
| | | | | 606/130 |
| 2012/0240710 | A1 | * | 9/2012 | Yokoyama ............. B25J 9/1065 |
| | | | | 74/490.05 |
| 2014/0053668 | A1 | * | 2/2014 | Shan .......................... B25J 5/02 |
| | | | | 74/89.14 |
| 2015/0122559 | A1 | * | 5/2015 | Nagatsuka ............. B25J 9/1065 |
| | | | | 180/8.6 |

FOREIGN PATENT DOCUMENTS

| | | |
|---|---|---|
| JP | S61-61789 | 3/1986 |
| JP | S61-136791 A | 6/1986 |
| JP | S62-48520 | 3/1987 |
| JP | H03-202288 A | 9/1991 |
| JP | H07-276270 A | 10/1995 |
| JP | 10193030 A * | 7/1998 |
| JP | H10-193030 A | 7/1998 |
| JP | 2002-542069 A | 12/2002 |
| JP | 2011-031372 A | 2/2011 |

OTHER PUBLICATIONS

May 17, 2016 Written Opinion issued in International Application No. PCT/2016/054531.

* cited by examiner

INDUSTRIAL ROBOT

TECHNICAL FIELD

The present invention relates to an industrial robot, particularly an industrial robot comprising an arm mechanism configured by a plurality of links.

BACKGROUND ART

Conventionally, the industrial robot is installed in various production factories of electric apparatus, machines, automobiles, and the like, as a conveyance robot for conveying objects and a work robot for machining objects.

The industrial robot takes on various forms according to its use, and it needs high mechanical rigidity and high servo rigidity to be operated under a high load condition without difficulty. Further, the robot needs to be operated over a wide range in some uses.

In order to ensure high mechanical rigidity of the robot, a robot is proposed wherein a parallel link structure is employed in each of an upper arm mechanism and a lower arm mechanism (Patent Document 1).

Further, another robot is proposed wherein the parallel link structure is employed in the lower arm mechanism and also the upper arm mechanism can be operated independently of the lower arm mechanism in order to ensure high mechanical rigidity while ensuring a wide operation range (Patent Document 2).

Additionally, another robot employing a ball screw for an arm drive mechanism is proposed (Patent Document 3). Generally, the ball screw can ensure high mechanical rigidity by properly setting its operation range. Thus, mechanical rigidity of the robot can be enhanced by employing the ball screw as the arm drive mechanism.

CITATION LIST

Patent Documents

[Patent Document 1] Japanese Patent Application Laid-Open No. 2011-31372 [Patent Document 2] Japanese Patent Application Laid-Open No. H03-202288 [Patent Document 3] Japanese Patent Application Laid-Open No. S60-44277

SUMMARY OF INVENTION

Objects to be Achieved by the Invention

Now, in some uses, high mechanical rigidity, servo rigidity, and precision need to be ensured under a high load condition over a wide operation range, while it is extremely difficult or impossible to simultaneously satisfy such strict conditions by the above-mentioned conventionally proposed robot.

The present invention is made considering the above-mentioned problems of the conventional technologies, and its object is to provide an industrial robot capable of ensuring high mechanical rigidity, servo rigidity, and precision under a high load condition over a wide operation range.

Means for Achieving the Objects

In order to achieve the object above, an industrial robot according to a first aspect of the present invention comprises: a base portion; an arm unit provided to the base portion; and an arm drive unit for driving the arm unit; wherein the arm unit has a lower arm mechanism including a parallel link structure, and an upper arm mechanism provided to a top portion of the lower arm mechanism, wherein the lower arm mechanism has a front link including a lower end rotatably connected to the base portion and a rear link including a lower end rotatably connected to the base portion, wherein the arm drive unit has a lower arm drive mechanism for driving the lower arm mechanism, wherein the lower arm drive mechanism has a lower ball screw including a nut and a shaft, and a lower bearing portion supporting the shaft so as to be rotatable about its axis, wherein an extending portion extending from the lower end of either one of the front link and the rear link is connected to the nut so as to be rotatable about a nut side rotational axis, wherein the lower bearing portion is connected to the base portion so as to be rotatable about a bearing portion side rotational axis, and wherein the nut side rotational axis and the bearing portion side rotational axis are parallel with rotational axes of the front link and the rear link.

A second aspect of the present invention is that, in the first aspect, the extending portion extends downward from the lower end of either one of the front link and the rear link.

A third aspect of the present invention is that, in the first or second aspect, the bearing portion side rotational axis is positioned closer to the lower end of either one of the front link and the rear link than the lower end of the other one of the front link and the rear link.

A fourth aspect of the present invention is that, in the third aspect, the bearing portion side rotational axis is positioned near the lower end of either one of the front link and the rear link.

A fifth aspect of the present invention is that, in any one of the first to fourth aspects, the bearing portion side rotational axis is positioned lower than a rotational axis of the lower end of either one of the front link and the rear link.

A sixth aspect of the present invention is that, in any one of the first to fifth aspects, a lower arm drive mechanism has a ball screw drive portion for rotatively driving the shaft of the lower ball screw about its axis, wherein the ball screw drive portion has a pair of drive motors for applying a power to a common rotary shaft.

A seventh aspect of the present invention is that, in any one of the first to sixth aspects, the lower arm mechanism has a lateral link including both ends rotatably connected to an upper end of the front link and an upper end of the rear link respectively, wherein the upper arm mechanism is connected to the lateral link so as to be rotatable about an upper arm rotational axis.

An eighth aspect of the present invention is that, in the seventh aspect, the arm drive unit has an upper arm drive mechanism for driving the upper arm mechanism, wherein the upper arm drive mechanism has an upper ball screw including a nut and a shaft, and an upper bearing portion supporting the shaft of the upper ball screw so as to be rotatable about its axis, wherein the upper arm mechanism is connected to the nut of the upper ball screw at a position different from the upper arm rotational axis so as to be rotatable about a nut side rotational axis, wherein the upper bearing portion is connected to the lateral link so as to be rotatable about a bearing portion side rotational axis, and wherein the nut side rotational axis and the bearing portion side rotational axis of the upper ball screw are parallel with the upper arm rotational axis.

A ninth aspect of the present invention is that, in the eighth aspect, the bearing portion side rotational axis of the upper ball screw is positioned in an extending portion extending rearward from a rear end of the lateral link.

A tenth aspect of the present invention is that, in the eighth or ninth aspect, the upper arm drive mechanism has an upper ball screw drive portion for rotatively driving the shaft of the upper ball screw about its axis, wherein the upper ball screw drive portion has a pair of drive motors for applying a power to a common rotary shaft.

In order to achieve the object above, an industrial robot according to an eleventh aspect of the present invention comprises: a base portion; an arm unit provided to the base portion; and an arm drive unit for driving the arm unit; wherein the arm unit has a lower arm mechanism including a parallel link structure, and an upper arm mechanism provided to a top portion of the lower arm mechanism, wherein the lower arm mechanism has a front link including a lower end rotatably connected to the base portion, a rear link including a lower end rotatably connected to the base portion, and a lateral link including both ends rotatably connected to an upper end of the front link and an upper end of the rear link respectively, wherein the upper arm mechanism is connected to the lateral link so as to be rotatable about an upper arm rotational axis, wherein the arm drive unit has an upper arm drive mechanism for driving the upper arm mechanism, wherein the upper arm drive mechanism has an upper ball screw including a nut and a shaft, and an upper bearing portion supporting the shaft so as to be rotatable about its axis, wherein the upper arm mechanism is connected to the nut of the upper ball screw at a position different from the upper arm rotational axis so as to be rotatable about a nut side rotational axis, wherein the upper bearing portion is connected to the lateral link so as to be rotatable about a bearing portion side rotational axis, and wherein the nut side rotational axis and the bearing portion side rotational axis of the upper ball screw are parallel with the upper arm rotational axis.

A twelfth aspect of the present invention is that, in the eleventh aspect, the bearing portion side rotational axis of the upper ball screw is positioned in an extending portion extending rearward from a rear end of the lateral link.

A thirteenth aspect of the present invention is that, in the eleventh or twelfth aspect, the upper arm drive mechanism has an upper ball screw drive portion for rotatively driving the shaft of the upper ball screw about its axis, wherein the upper ball screw drive portion has a pair of drive motors for applying a power to a common rotary shaft.

In order to achieve the object above, an industrial robot according to a fourteenth aspect of the present invention comprises: a base portion; an arm unit provided to the base portion; and an arm drive unit for driving the arm unit; wherein the arm unit has a lower arm mechanism and an upper arm mechanism provided to a top portion of the lower arm mechanism, and wherein the arm drive unit has a lower ball screw for driving the lower arm mechanism and an upper ball screw for driving the upper arm.

A fifteenth aspect of the present invention is that, in the fourteenth aspect, the lower arm mechanism comprises a parallel link structure having a front link including a lower end rotatably connected to the base portion, a rear link including a lower end rotatably connected to the base portion, and a lateral link including both ends rotatably connected to an upper end of the front link and an upper end of the rear link respectively.

A sixteenth aspect of the present invention is that, in the fifteenth aspect, the upper arm mechanism is connected to the lateral link so as to be rotatable about an upper arm rotational axis.

A seventeenth aspect of the present invention is that, in any one of the fourteenth to sixteenth aspects, the upper arm drive mechanism has an upper ball screw drive portion for rotatively driving the shaft of the upper ball screw about its axis, wherein the upper ball screw drive portion has a pair of drive motors for applying a power to a common rotary shaft, wherein the lower arm drive mechanism has a lower ball screw drive portion for rotatively driving the shaft of the lower ball screw about its axis, and wherein the lower ball screw drive portion has a pair of drive motors for applying a power to a common rotary shaft.

Effect of the Invention

According to the present invention, an industrial robot capable of ensuring high mechanical rigidity, servo rigidity, and precision under a high load condition over a wide operation range can be provided.

EMBODIMENT OF THE INVENTION

Figure 1:
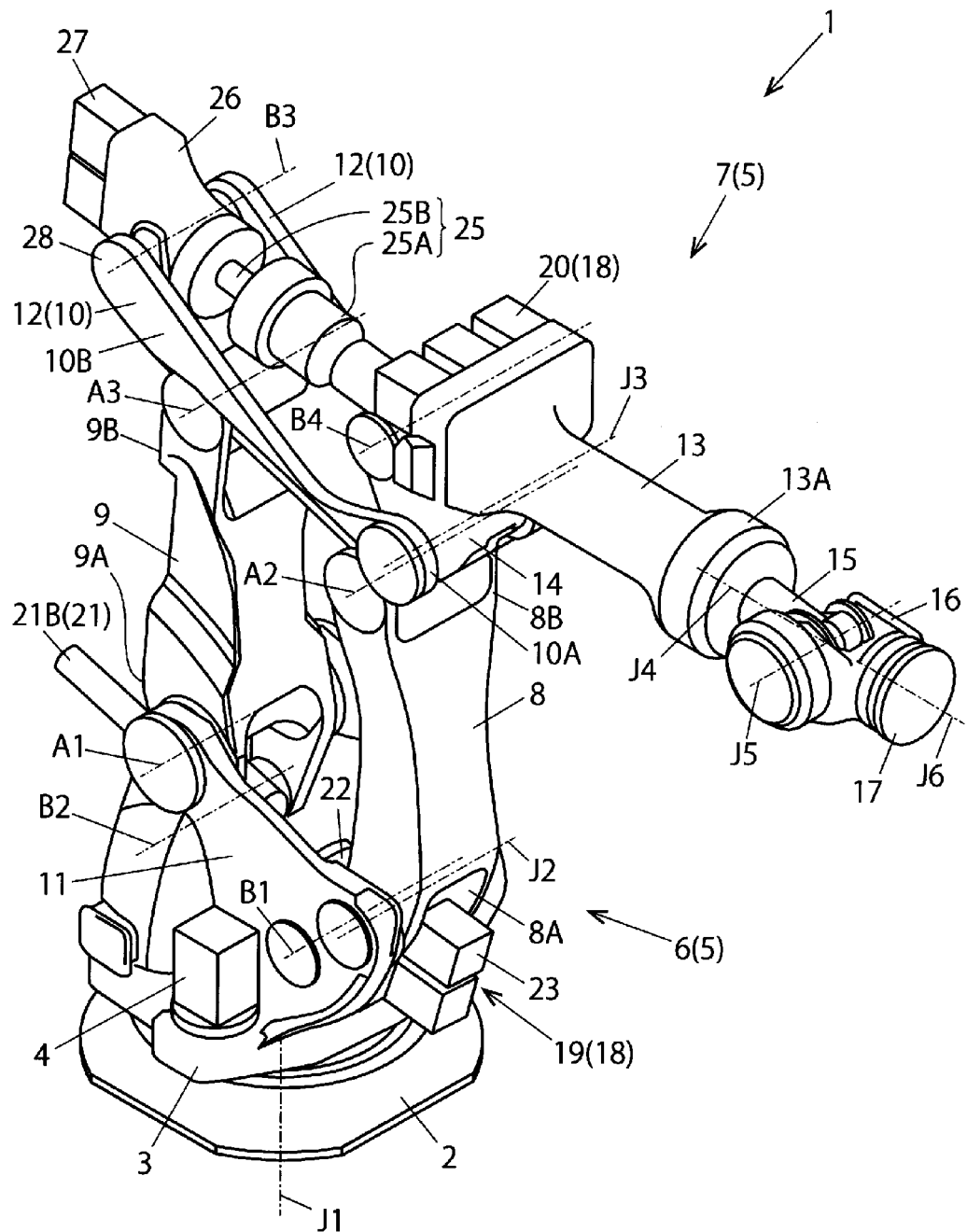
FIG. 1 is a perspective view illustrating an industrial robot according to one embodiment of the present invention.

Hereunder, an industrial robot according to one embodiment of the present invention will be described referring to the drawings.

As illustrated in FIG. 1 to FIG. 7, an industrial robot 1 according to this embodiment has a base 2 which is installed on a floor surface, and a turning base portion 3 is provided to this base 2 so as to be rotatable about a first rotational axis (turning axis) J1 extending in a vertical direction.

Figure 2:
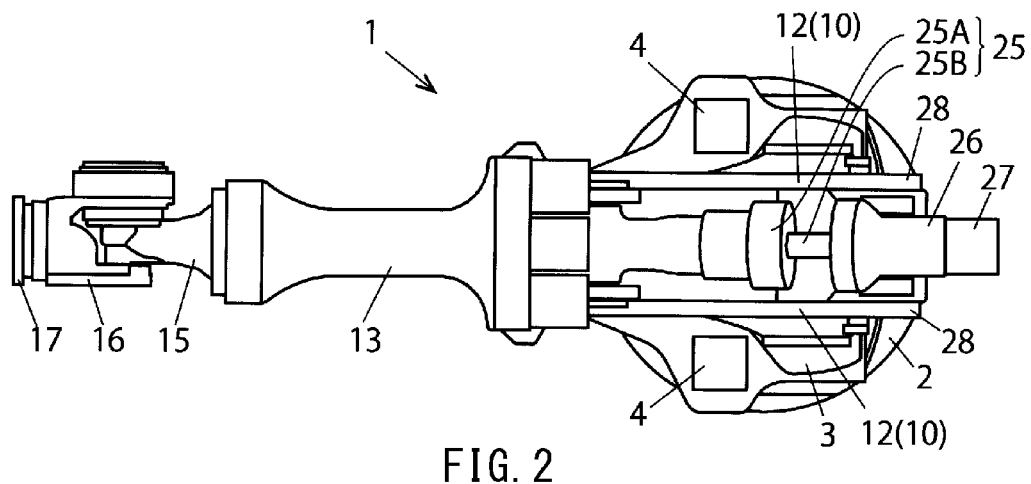
FIG. 2 is a top view of the industrial robot in FIG. 1.
Figure 3:
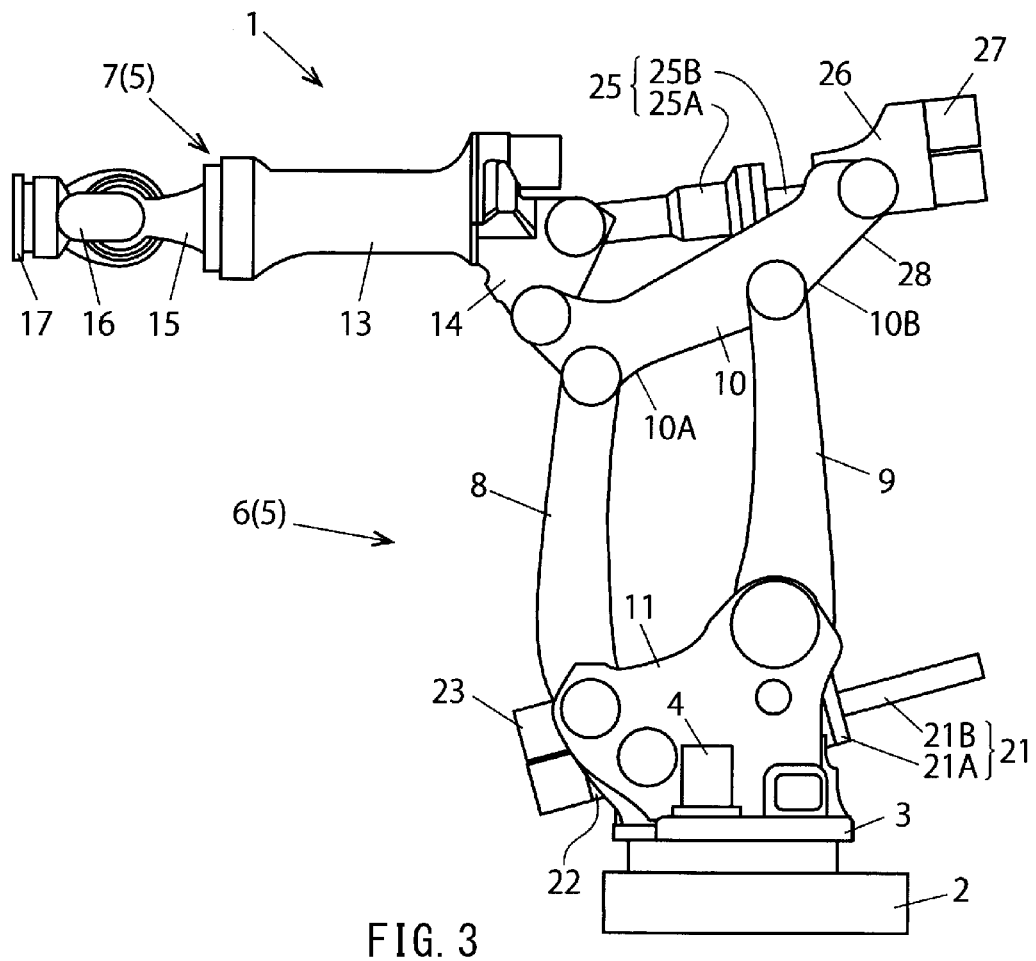
FIG. 3 is a side view of the industrial robot in FIG. 1.
Figure 4:
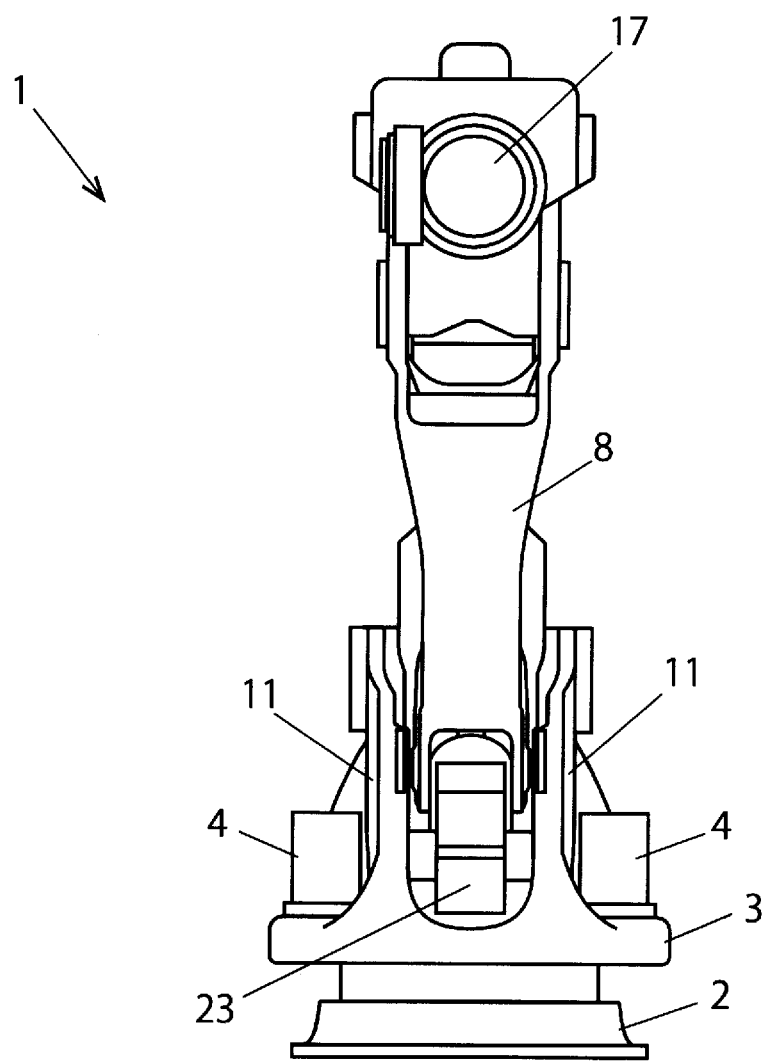
FIG. 4 is a front view of the industrial robot in FIG. 1.
Figure 5:
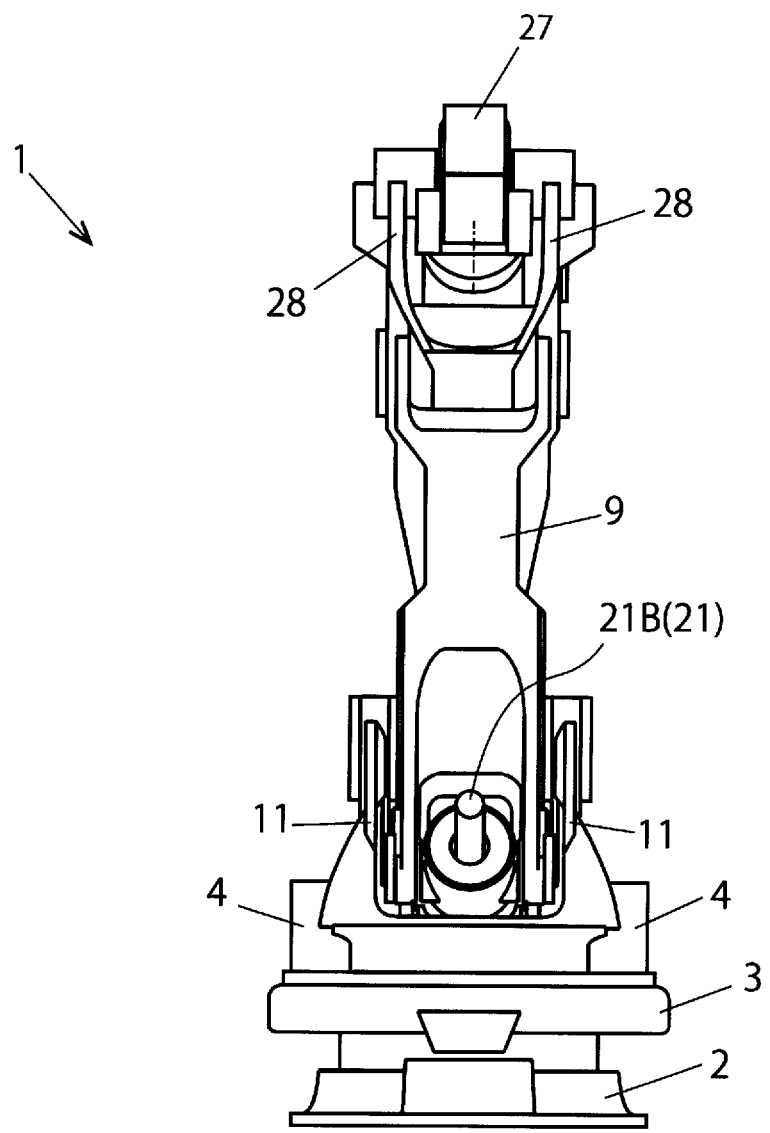
FIG. 5 is a back view of the industrial robot in FIG. 1.

As is well illustrated in FIG. 2, a pair of servo motors 4 are provided on both left and right sides of the turning base portion 3, and the turning base portion 3 is rotatively driven about the first rotational axis with respect to the base 2 by these servo motors 4.

As is well illustrated in FIG. 1, an arm unit 5 is provided to the turning base portion 3 of the robot 1, and the arm unit 5 has a lower arm mechanism 6 having a parallel link structure and an upper arm mechanism 7 provided to a top of the lower arm mechanism 6.

Figure 6:
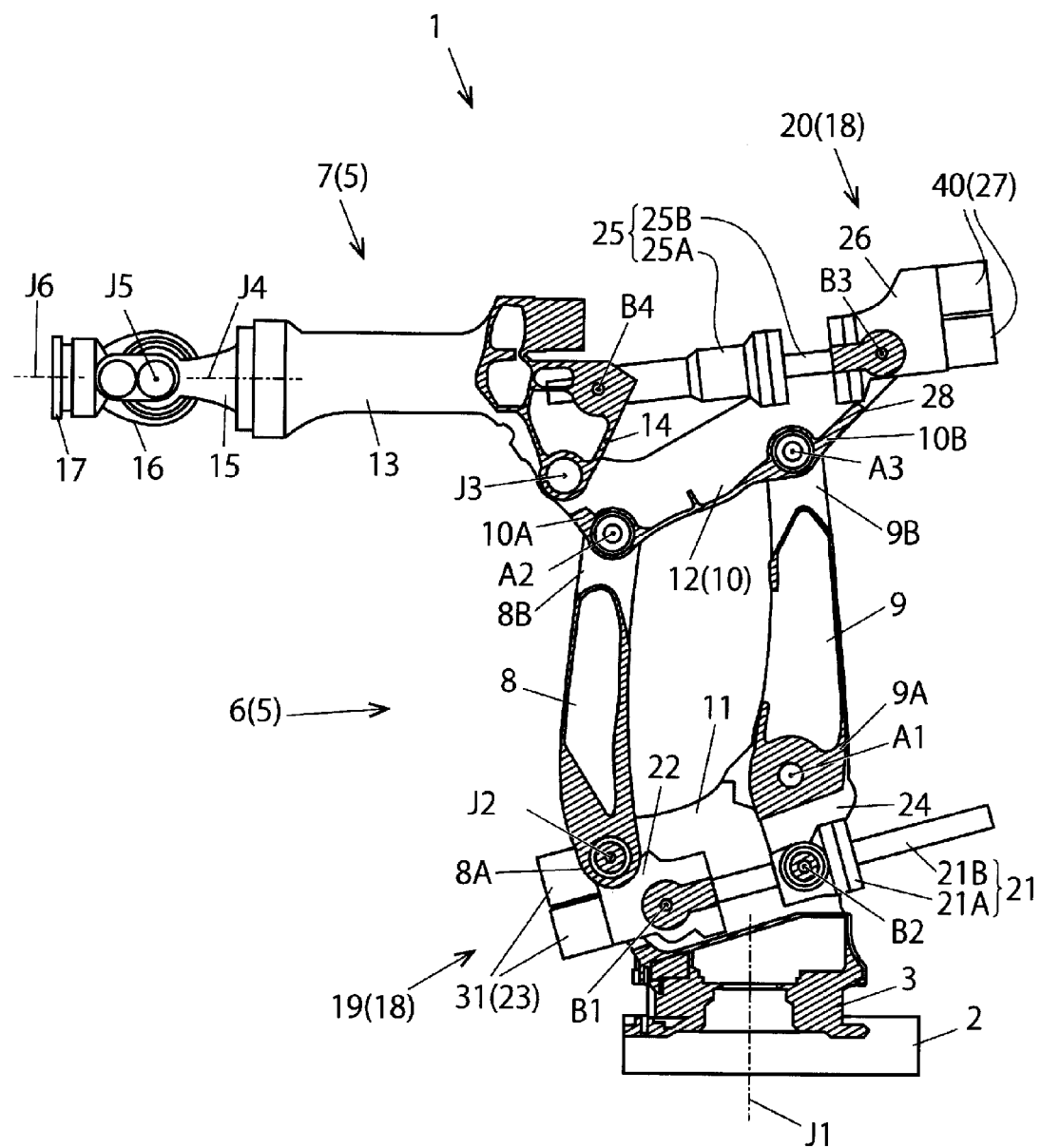
FIG. 6 is a partial section view illustrating an internal structure of the industrial robot in FIG. 1.

As is well illustrated in FIG. 6, the lower arm mechanism 6 has a first link (front link) 8 having a lower end 8A which is rotatably connected to the turning base portion 3, a vertical link (rear link) 9 having a lower end 9A which is rotatably connected to the turning base portion 3, and a lateral link 10 including both ends 10A, 10B which are rotatably connected to an upper end 8B of the first link 8 and an upper end 9B of the vertical link 9, respectively.

As mentioned above, both the lower end 8A of the first link 8 and the lower end 9A of the vertical link 9 are connected to the turning base portion 3, and therefore the parallel link structure of the lower arm mechanism 6 is a parallel link structure whose lower side is fixed. Thereby, mechanical rigidity of the lower arm mechanism 6 can be sharply enhanced.

The turning base portion 3 has, at its top portion, a pair of left and right lower support plates 11 extending in a longitudinal direction and a vertical direction. The lower end 8A of the first link 8 is inserted between the left and right lower support plates 11 and connected to the left and right lower support plates 11 so as to be rotatable about a second rotational axis J2 extending in a horizontal direction. The lower end 9A of the vertical link 9 is inserted between the left and right lower support plates 11 and connected to the left and right lower support plates 11 so as to be rotatable about a rear lower rotational axis A1 extending in the horizontal direction.

The lateral link 10 has a pair of left and right upper support plates 12 extending in the longitudinal direction and the vertical direction. The upper end 8B of the first link 8 is inserted between the left and right upper support plates 12 and connected to the left and right upper support plates 12 so as to be rotatable about a front upper rotational axis A2 extending in the horizontal direction. The upper end 9B of the vertical link 9 is inserted between the left and right upper support plates 12 and connected to the left and right upper support plates 12 so as to be rotatable about a rear upper rotational axis A3 extending in the horizontal direction.

The upper arm mechanism 7 has a second link 13, and a rear end extending portion 14 extending from a rear end of the second link 13 is inserted between front end sections of the left and right upper support plates 12 and connected to the left and right upper support plates 12 so as to be rotatable about the third rotational axis (upper arm rotational axis) J3 extending in the horizontal direction. A connection link 15 is connected to a front end 13A of the second link 13 so as to be rotatable about a fourth rotational axis J4 extending in a longitudinal axis direction of the second link 13.

A wrist portion 16 is connected to a front end of the connection link 15 so as to be rotatable about a fifth rotational axis J5 extending in a direction orthogonal to the fourth rotational axis J4. A rotary body 17 is connected to a front end of the wrist portion 16 so as to be rotatable about a sixth rotational axis J6 extending in a direction orthogonal to the fifth rotational axis J5.

The industrial robot 1 comprises an arm drive unit 18 for driving the arm unit 5 having the lower arm mechanism 6 and the upper arm mechanism 7.

The arm drive unit 18 has a lower arm drive mechanism 19 for driving the lower arm mechanism 6 and an upper arm drive mechanism 20 for driving the upper arm mechanism 7.

As is well illustrated in FIG. 6, the lower arm drive mechanism 19 has a lower ball screw 21 having a nut 21A and a shaft 21B, a lower bearing portion 22 supporting the shaft 21B so as to be rotatable about its axis, and a lower ball screw drive portion 23 for rotatively driving the shaft 21B of the lower ball screw 21 about its axis.

At least a part of the lower bearing portion 22 is arranged between the left and right lower support plates 11 and connected to the left and right lower support plates 11 so as to be rotatable about a bearing portion side rotational axis B1. The bearing portion side rotational axis B1 is positioned near a lower end 8A of the first link 8, below the second rotational axis J2.

The vertical link 9 has a pair of left and right lower end extending portions 24 extending downward from its lower end 9A. The nut 21A of the lower ball screw 21 is arranged between the left and right lower end extending portions 24 of the vertical link 9, and the nut 21A is connected to the left and right lower end extending portions 24 of the vertical link 9 so as to be rotatable about a nut side rotational axis B2.

The bearing portion side rotational axis B1 and the nut side rotational axis B2 are extended in the horizontal direction and parallel with the rotational axes J2, A1 of the first link (front link) and the vertical link (rear link).

The upper arm drive mechanism 20 of the arm drive unit 18 has an upper ball screw 25 having a nut 25A and a shaft 25B, an upper bearing portion 26 supporting the shaft 25B so as to be rotatable about its axis, and an upper ball screw drive portion 24 for rotatively driving the shaft 25B of the upper ball screw 25 about its axis.

Each of the left and right upper support plates 12 of the lateral link 10 has a rear end extending portion 28 extending rearward from its rear end. At least a part of the upper bearing portion 26 is arranged between the rear end extending portions 28 of the left and right upper support plates 12 of the lateral link 10 and connected to the left and right rear end extending portions 28 of the lateral link 10 so as to be rotatable about a bearing portion side rotational axis B3.

The rear end extending portion 14 extending from the rear end of the second link 13 is connected to the nut 25A of the upper ball screw 25 at a position different from the third rotational axis (upper arm rotational axis) J3 so as to be rotatable about a nut side rotational axis B4.

The nut side rotational axis B4 and the bearing portion side rotational axis B3 of the upper ball screw 25 are extended in the horizontal direction and parallel with the third rotational axis (upper arm rotational axis) J3.

Figure 7:
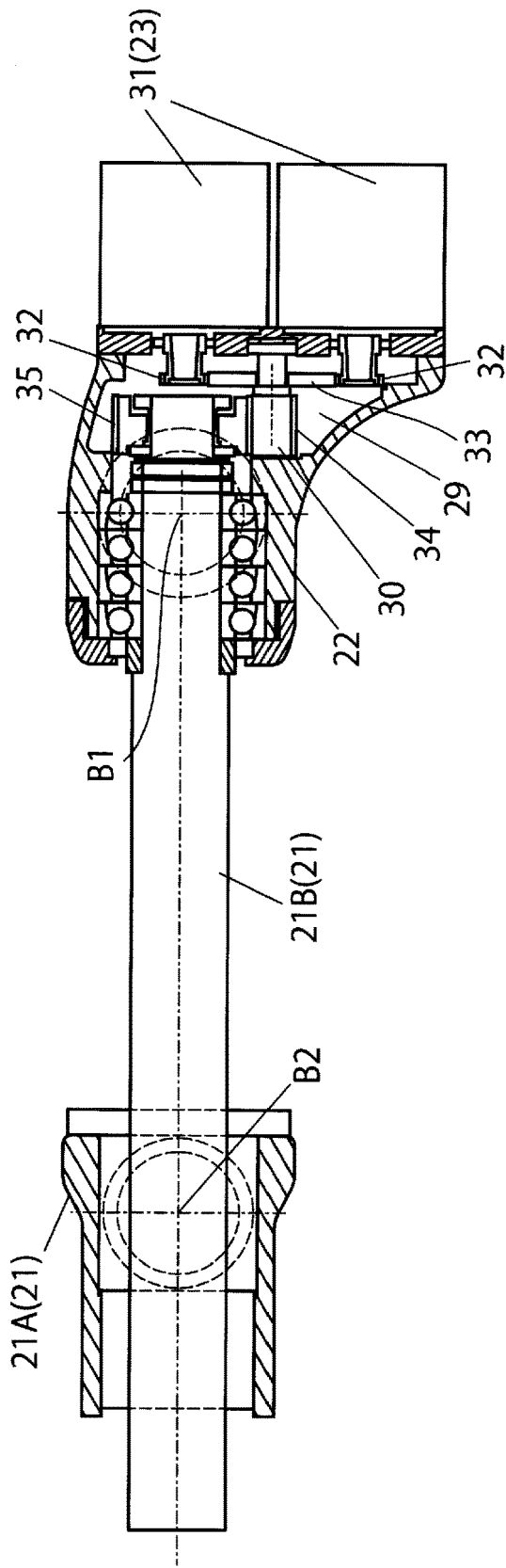
FIG. 7 is a longitudinal section view of a lower ball screw of the industrial robot in FIG. 1.

As illustrated in FIG. 7, the lower ball screw drive portion 23 has a pair of servo motors 31 applying power to a common rotary shaft 30 in a gear box 29. Thus, a pair of gears 32 provided to output shafts of the pair of servo motors 31 are engaged with an input side gear 33 provided to the common rotary shaft 30. An output side gear 34 provided to the common rotary shaft 30 is engaged with a gear 35 provided to a rear end of the shaft 21B of the lower ball screw 21.

As above, by driving the common rotary shaft 30 by the pair of servo motors 31, large drive force can be applied to the shaft 21B of the lower ball screw 21 without increasing capacity of each servo motor 31.

Figure 8:
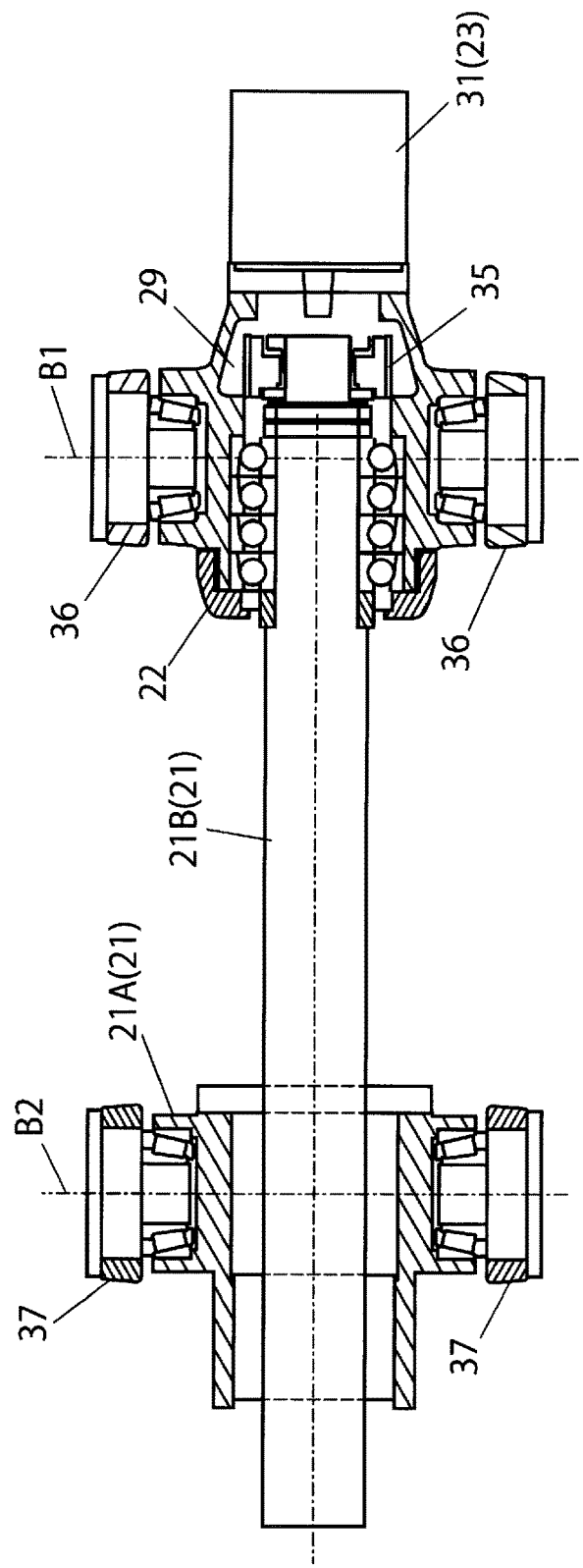
FIG. 8 is a cross section view of the lower ball screw of the industrial robot in FIG. 1.

As illustrated in FIG. 8, the lower baring portion 22 of the lower ball screw 21 is rotatably connected to the left and right lower support plates 11 of the turning base portion 4 via left and right support shafts 36 arranged on both the left and right sides of the shaft 21B along the bearing portion side rotational axis B1. The nut 21A of the lower ball screw 21 is rotatably connected to the left and right lower extending portions 24 of the vertical link 9 via left and right support shafts 37 arranged on both the left and right sides of the nut 21A along the nut side rotational axis B2.

Figure 9:
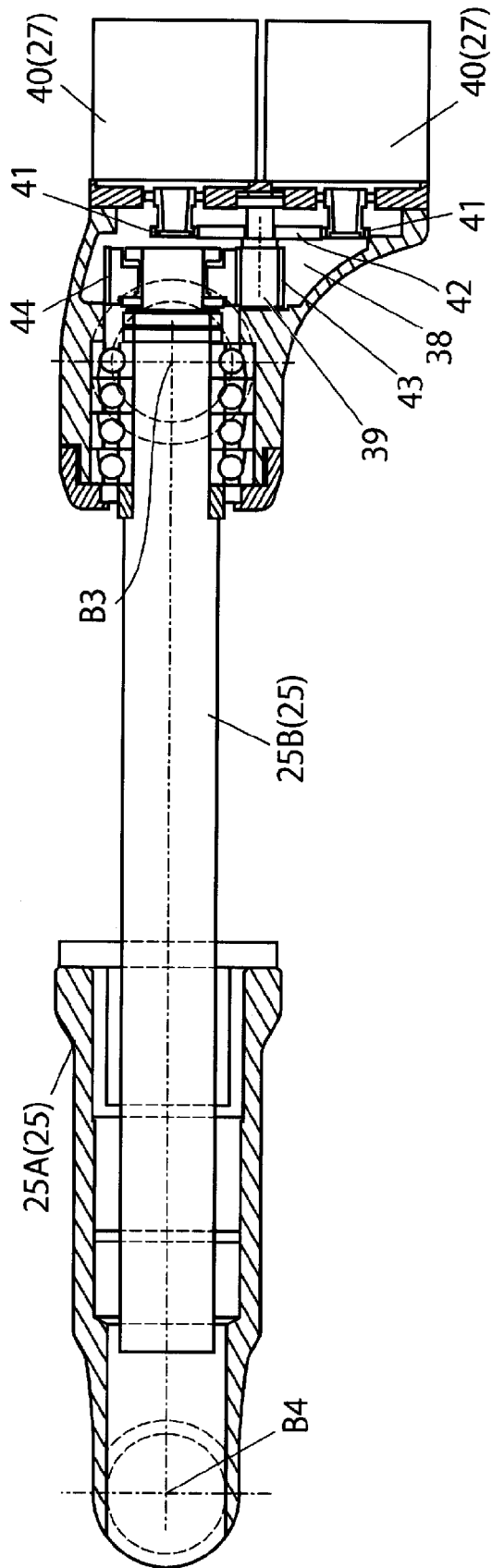
FIG. 9 is a longitudinal section view of an upper ball screw of the industrial robot in FIG. 1.

As illustrated in FIG. 9, an upper ball screw drive portion 27 has a pair of servo motors 40 applying power to a common rotary shaft 39 in a gear box 38. Thus, a pair of gears 41 provided to output shafts of the pair of servo motors 40 are engaged with an input side gear 42 provided to the common rotary shaft 39. An output side gear 43 provided to the common rotary shaft 39 is engaged with a gear 44 provided to a rear end of the shaft 25B of the upper ball screw 25.

As above, by driving the common rotary shaft 39 by the pair of servo motors 40, large drive force can be applied to the shaft 25B of the upper ball screw 25 without increasing capacity of each servo motor 40.

Figure 10:
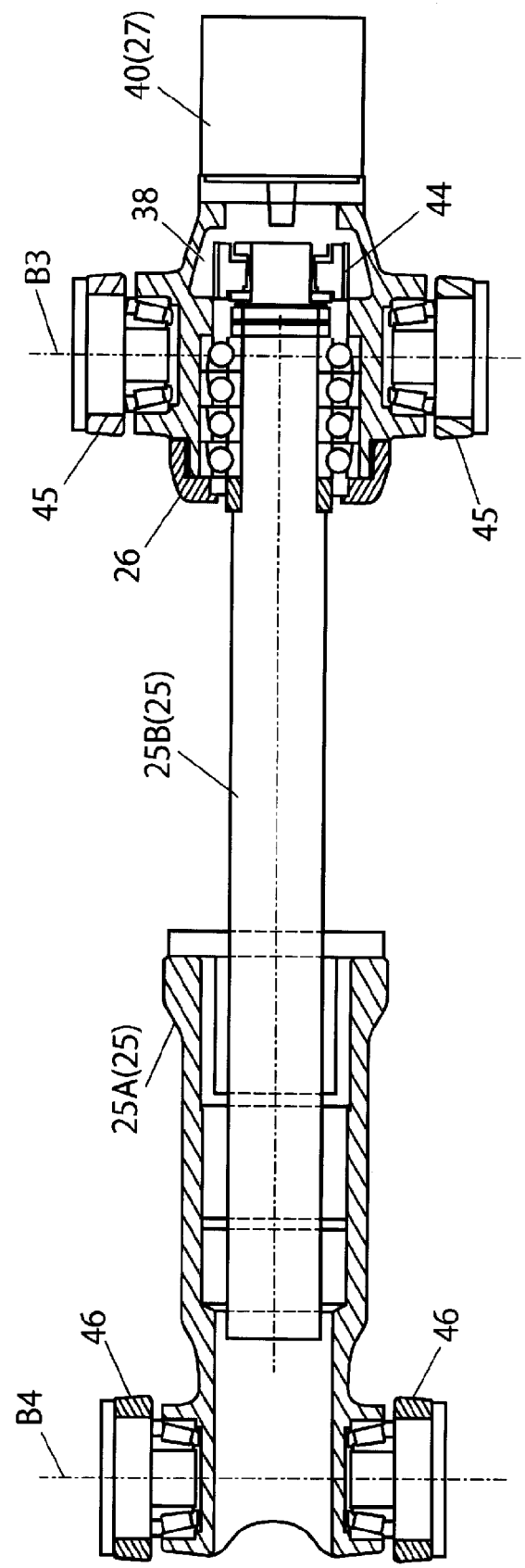
FIG. 10 is a cross section view of the upper ball screw of the industrial robot in FIG. 1.

As illustrated in FIG. 10, the upper baring portion 26 of the upper ball screw 25 is rotatably connected to the left and right rear end extending portions 28 of the lateral link 10 via left and right support shafts 45 arranged on both the left and right sides of the shaft 25B along the bearing portion side rotational axis B3. The nut 25A of the upper ball screw 25 is rotatably connected to the left and right rear end extending portions 14 of the second link 13 via left and right support shafts 46 arranged on both the left and right sides of the nut 25A along the nut side rotational axis B4.

In the above-mentioned industrial robot 1, for controlling the attitude of the lower arm mechanism 6, the servo motors 31 of the lower ball screw drive portion 23 are driven so as to linearly drive the nut 21A along the shaft 21B of the lower ball screw 21. Since the lower end extending portions 24 of the vertical link 9 are rotatably connected to the nut 21A, the vertical link 9 is rotated about the rear lower rotational axis A1 by the nut 21A linearly moving along the shaft 21B. Accordingly, the first link 8 and the lateral link 10 forming the parallel link structure along with the vertical link 9 are moved, and thereby the attitude of the lower arm mechanism 6 can be controlled.

For controlling the attitude of the upper arm mechanism 7, the servo motors 40 of the upper ball screw drive portion 27 are driven so as to linearly drive the nut 25A along the shaft 25B. Since the rear end extending portions 14 of the second link 13 are rotatably connected to the nut 25A, the second link 13 is rotated about the third rotational axis J3 by the nut 25A linearly moving along the shaft 25B. Thereby, the attitude of the upper arm mechanism 7 can be controlled.

Figure 11:
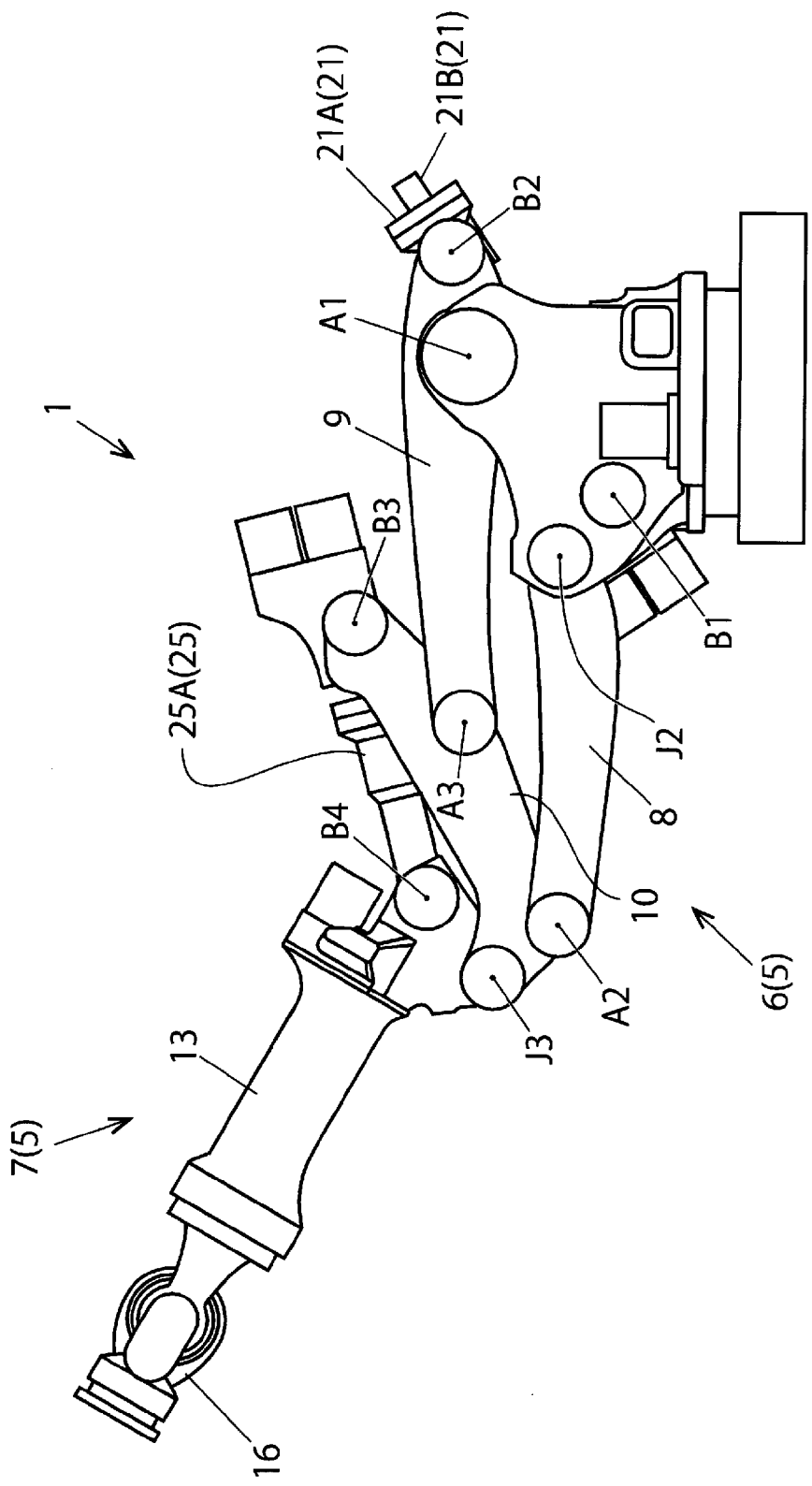
FIG. 11 is a side view illustrating another attitude of industrial robot in FIG. 1.
Figure 12:
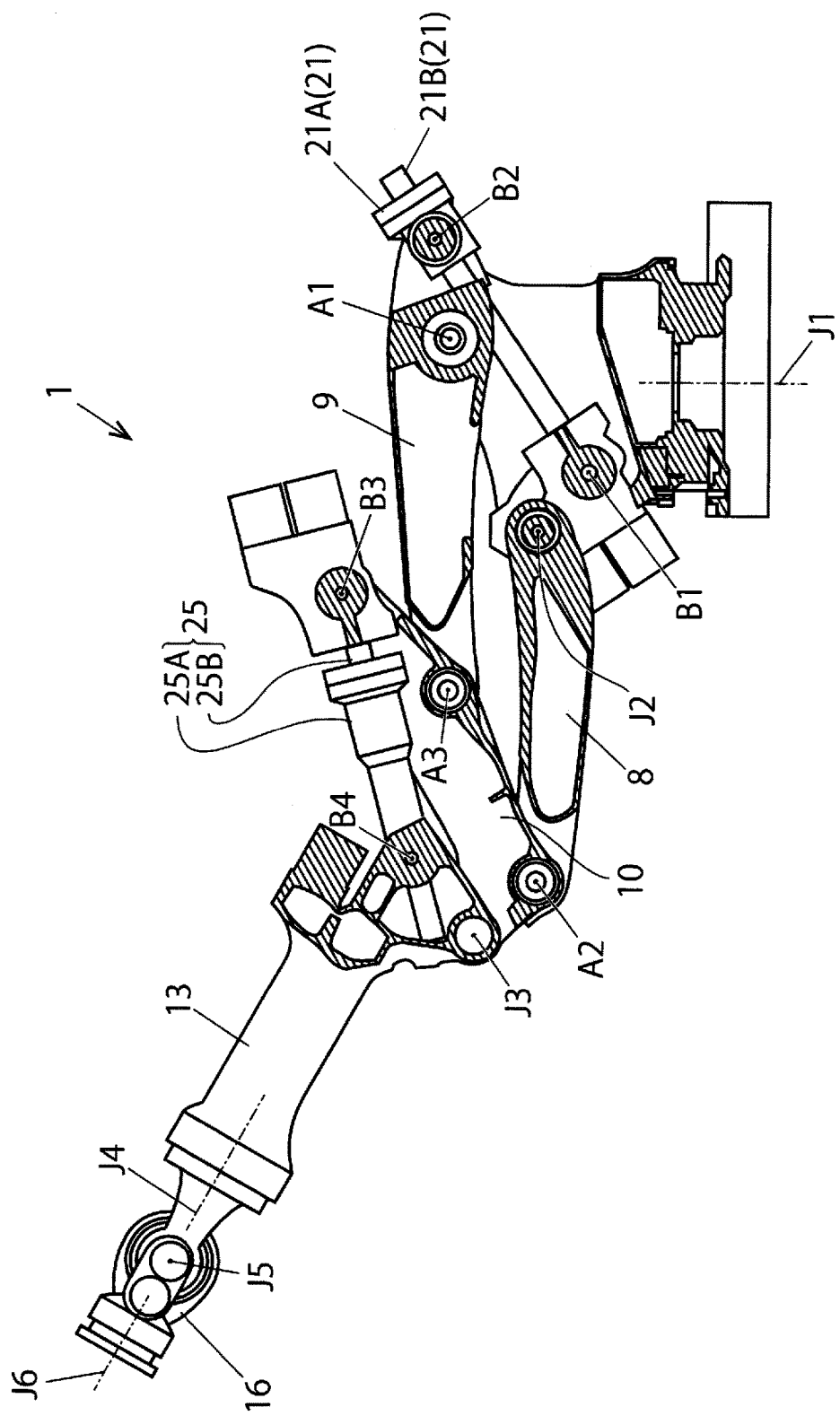
FIG. 12 is a partial section view of the industrial robot in FIG. 11.

FIG. 11 and FIG. 12 illustrate a state that the lower arm mechanism 6 is controlled to be a forward inclined attitude and also the upper arm mechanism 7 is controlled to be an upward attitude. At this time, the nut 21A of the lower ball screw 21 is position on a distal end side of the shaft 21B and the nut 25A of the upper ball screw 25 is positioned on a base end side of the shaft 25B When the lower arm mechanism 6 is changed from the upright attitude in FIG. 3 to the forward inclined attitude in FIG. 11, the shaft 21B of the lower ball screw 21 is rotated about the bearing portion rotational axis B1.

Since the second link 13 is connected to the lateral link 10 so as to be rotatable about the third rotational axis J3, the attitude of the upper arm mechanism 7 can be controlled independently of the attitude of the lower arm mechanism 6. Note that the attitude of the lateral link 10 of the lower arm mechanism 6 having the parallel link structure is not changed even when the attitudes of the first link 8 and the vertical link 9 are changed.

Figure 13:
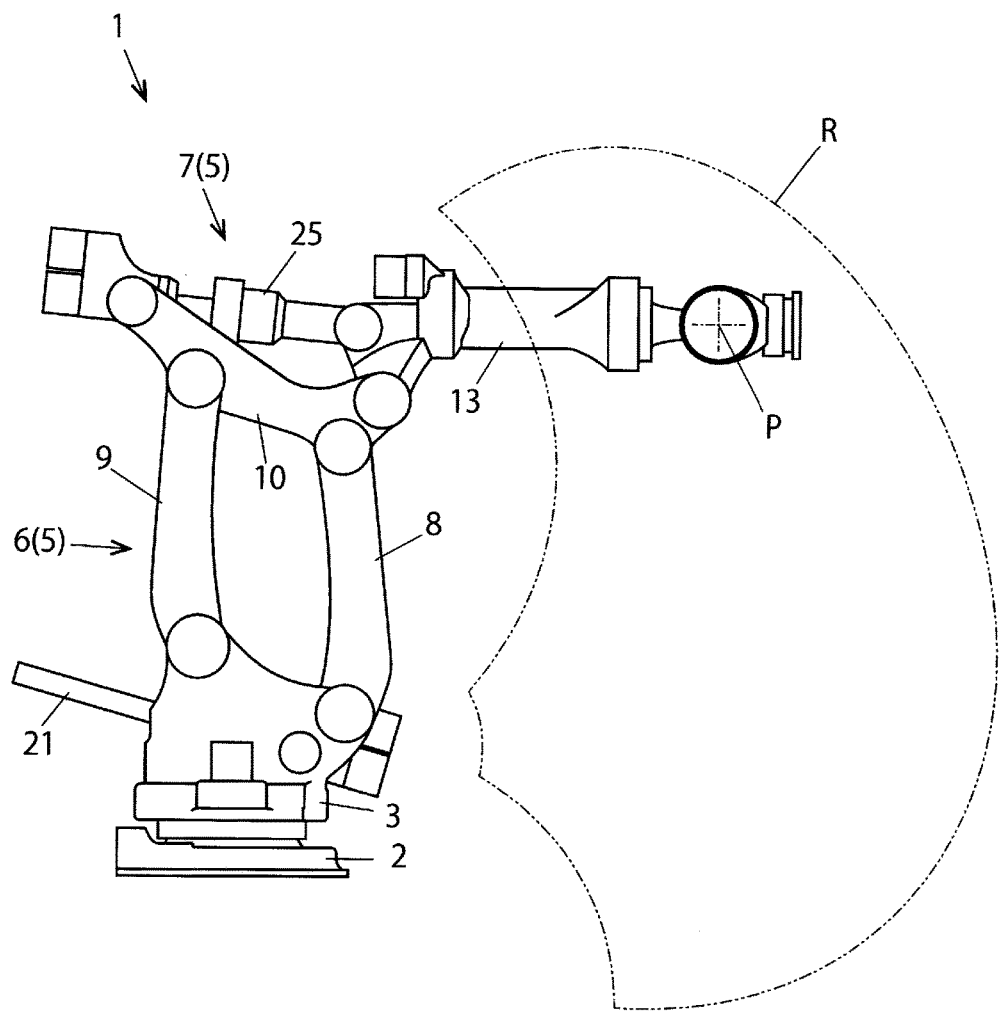
FIG. 13 is a view illustrating an example of operation range of the industrial robot in FIG. 1.

FIG. 13 illustrates an example of an operation range R of a point P positioned at the fifth rotational axis J5 which is a rotational axis of the wrist portion 16 of the industrial robot 1. As seen in FIG. 13, the industrial robot 1 according to this embodiment can widely ensure its operation range R front-upwardly and front-downwardly.

As mentioned above, in the industrial robot 1 according to this embodiment, the lower side of the parallel link structure of the lower arm mechanism 6 is fixed and also the lower ball screw 21 is used for driving the lower arm mechanism 6, and further the upper arm mechanism 7 is connected to the lower arm mechanism 6 so as to be rotatable about the third rotational axis J3. Therefore, high mechanical rigidity can be endured over a wide operation range front-upwardly and front-downwardly under a high load condition.

Additionally, the nut 21A of the lower ball screw 21 is rotatably connected to the lower extending portions 24 of the vertical link (rear link) 9 and also the bearing side rotational axis B1 of the lower ball screw 21 is arranged near the lower end 8A of the first link 8 below the second rotational axis J2 of the first link (front link) 8. Therefore, the lower ball screw 21 never interferes with the lower arm mechanism 6 even when the lower arm mechanism 6 is changed from the upright attitude (FIG. 3) to the forward inclined attitude (FIG. 11) or vice versa.

Accordingly, a large change amount of the attitude of the lower arm mechanism 6 can be ensured, and eventually a wide operation range of the robot 1 can be ensured. Additionally, since a popup direction of the shaft 21B of the lower ball screw 21 is directed rearward, namely opposite to the work area of the robot 1, the lower ball screw 21 can also be prevented from interfering the with the work area.

Additionally, by the industrial robot 1 according to this embodiment, mechanical rigidity of the robot 1 can be further enhanced since the upper ball screw 25 is used for driving the upper arm mechanism 7. Thus, by employing the ball screw for drive mechanisms of both the lower arm mechanism 6 and the upper arm mechanism 7, mechanical rigidity of the whole robot can be significantly enhanced.

Additionally, in the industrial robot 1 according to this embodiment, the lower ball screw 21 and the upper ball screw 25 are used for the respective drive mechanisms of the lower arm mechanism 6 and the upper arm mechanism 7. Generally, the ball screw has a high transmission efficiency of power and small play, and thus it has high back drivability.

Accordingly, for example a position displacement due to external force in a high load can be controlled by feedback control with high accuracy via software. Particularly, by employing the ball screw for the drive mechanisms of both the lower arm mechanism 6 and the upper drive mechanism 7, position control accuracy of the whole robot can be significantly enhanced.

Additionally, in the industrial robot 1 according to this embodiment, the second arm 13 is rotatably connected to the lateral link 10 whose attitude is always constant. Therefore, drive force of the upper ball screw 25 can be largest in an attitude that a gravity torque of the second arm 13 is large, and also drive force of the upper ball screw 25 can be larger in an attitude which needs rigidity most.

Additionally, in the industrial robot 1 according to this embodiment, the lower side of the parallel link structure of the lower arm mechanism 6 is fixed and also the lower ball screw 21 and its drive portion are arranged below the first link 8 and the vertical link 9. Therefore, the lower ball screw 21 can be provided in a compact arrangement without enlarging the size of the turning base portion 3.

Additionally, in the industrial robot 1 according to this embodiment, the ball screw is driven by two servo motors. Therefore, large drive force can be applied to the shaft of the ball screw without enlarging capacity of each servo motor, and a robot which can cope with a high load condition can be easily manufactured.

Additionally, in the industrial robot 1 according to this embodiment, the lower side of the parallel link structure of the lower arm mechanism 6 is fixed. Therefore, optimal design can be achieved according to use regarding which part to ensure high rigidity/high torque in the operation range of the robot 1 even when the ball screw is employed for the drive mechanism of the upper arm mechanism 7 as mentioned above.

Thus, for realizing rotational operation of the arm link using the ball screw (linearly moving actuator), the shortest distance between the rotational axis of the arm link and the longitudinal axis of the shaft (linearly moving shaft)) of the ball screw influences torque and rigidity.

In the embodiment above, the shortest distance between the rear lower rotational axis A1 of the vertical link 9 and the longitudinal axis of the shaft 21B of the lower ball screw 21 (length of a perpendicular line drawn from the rear lower rotational axis A1 to the longitudinal axis of the shaft 21B) influences torque and rigidity of the lower arm mechanism 6.

Similarly, the shortest distance between the third rotational axis J3 of the second link 13 and the longitudinal axis of the shaft 25B of the upper ball screw 25 (length of a perpendicular line drawn from the third rotational axis J3 to the longitudinal axis of the shaft 25B) influences torque and rigidity of the upper arm mechanism 7.

When the vertical link 9 is rotated about the rear lower rotational axis A1, the lower end extending portion (nut side rotational axis B2) 24 of the vertical link 9 moves in an arc shape about the rear lower rotational axis A1 as a center, and therefore the shortest distance between the longitudinal axis of the shaft (linearly moving shaft) 21B of the lower ball screw 21 and the rear lower rotational axis A1 is changed. Thereby, rigidity/output torque, and velocity in the lower arm mechanism 6 is changed.

Similarly, when the second link 13 is rotated about the third rotational axis J3, the part of the nut side rotational axis B4 of the rear end extending portion 14 of the second link 13 moves in an arc shape about the third rotational axis J3 as a center, and therefore the shortest distance between the longitudinal axis of the shaft (linearly moving shaft) 25B of the upper ball screw 25 and the third rotational axis J3 is changed. Thereby, rigidity/output torque, and velocity in the upper arm mechanism 7 is changed.

As mentioned above, rigidity/output torque, and velocity in the lower arm mechanism 6 is changed according to the rotational operation of the vertical link 9 and also rigidity/output torque, and velocity in the upper arm mechanism 7 is changed according to the rotational operation of the second link 13, and therefore an optimal design needs to be achieved according to use considering which part to ensure high rigidity/high torque in the operation range of the robot 1.

Here, if rotation is made possible without fixing the lower side of the parallel link structure of the lower arm mechanism 6 (refer to Patent Document 3), the shortest distance between the third rotational axis J3 of the second link 13 and the longitudinal axis of the shaft 25B of the upper ball screw 25 is changed by the attitude of the first link 8 even when the attitude of the second link 13 is not changed. Therefore, regarding which part to ensure high rigidity/high torque in the operation range, a well-balanced area setting is difficult from a view point of gravity which always acts in a fixed direction.

In contrast, in the industrial robot 1 according to this embodiment, the lower side of the parallel link structure of the lower arm mechanism 6 is fixed. Therefore, the attitude of the lateral link 10 configuring the upper side of the parallel link structure of the lower arm mechanism 6 is not influenced by change of the attitude of the first arm 8. Thus, the shortest distance between the third rotational axis J3 of the second link 13 and the longitudinal axis of the shaft 25B of the upper ball screw 25 is never changed by the attitude of the first link 8 unless the attitude of the second link 13 is changed.

Accordingly, even when the ball screw is employed for a drive mechanism of the upper arm mechanism 7, a well-balanced area setting can be easily achieved regarding which part to ensure high rigidity/high torque in the operation range.

DESCRIPTION OF REFERENCE NUMERALS

1 . . . industrial robot
2 . . . base
3 . . . turning base portion
4 . . . servo motor for turning
5 . . . arm unit
6 . . . lower arm mechanism
7 . . . upper arm mechanism
8 . . . first link (front link)
8A . . . lower end of first link
8B . . . upper end of first link
9 . . . vertical link (rear link)
9A . . . lower end of vertical link
9B . . . upper end of vertical link
10 . . . lateral link
10A . . . front end of lateral link
10B . . . rear end of lateral link
11 . . . lower support plate
12 . . . upper support plate
13 . . . second link
13A . . . front end of second link
14 . . . rear end extending portion of second link
15 . . . connection link
16 . . . wrist portion
17 . . . rotary body
18 . . . arm drive unit
19 . . . lower arm drive mechanism
20 . . . upper arm drive mechanism
21 . . . lower ball screw
21A . . . nut of lower ball screw
21B . . . shaft of lower ball screw
22 . . . lower baring portion
23 . . . lower ball screw drive portion
24 . . . lower end extending portion of vertical link
25 . . . upper ball screw
25A . . . nut of upper ball screw
25B . . . shaft of upper ball screw
26 . . . upper baring portion
27 . . . upper ball screw drive portion
28 . . . rear end extending portion of lateral link
29 . . . gear box of lower ball screw drive portion
30 . . . common rotary shaft of lower ball screw drive portion
31 . . . servo motor of lower ball screw drive portion
32, 33, 34, 35 . . . gear of lower ball screw drive portion
36, 37 . . . support shaft of lower ball screw
38 . . . gear box of upper ball screw drive portion
39 . . . common rotary shaft of upper ball screw drive portion
40 . . . servo motor of upper ball screw drive portion
41, 42, 43, 44 . . . gear of upper ball screw drive portion
45, 46 . . . support shaft of upper ball screw
J1 . . . first rotational axis (turning axis)
J2 . . . second rotational axis
J3 . . . third rotational axis (upper arm rotational axis)
J4 . . . fourth rotational axis
J5 . . . fifth rotational axis
J6 . . . sixth rotational axis
A1 . . . rear lower rotational axis A2 . . . front upper rotational axis
A3 . . . rear upper rotational axis
B1 . . . bearing portion side rotational axis of lower ball screw
B2 . . . nut side rotational axis of lower ball screw
B3 . . . bearing portion side rotational axis of upper ball screw
B4 . . . nut side rotational axis of upper ball screw
R . . . operation range of robot

The invention claimed is:

1. An industrial robot, comprising:
a base portion;
an arm unit provided to the base portion; and
an arm drive unit for driving the arm unit;
wherein the arm unit has a lower arm mechanism including a parallel link structure, and an upper arm mechanism provided to a top portion of the lower arm mechanism,
wherein the lower arm mechanism has a front link including a lower end rotatably connected to the base portion and a rear link including a lower end rotatably connected to the base portion,
wherein the arm drive unit has a lower arm drive mechanism for driving the lower arm mechanism,
wherein the lower arm drive mechanism has a lower ball screw including a nut and a shaft, and a lower bearing portion supporting the shaft so as to be rotatable about its axis,
wherein an extending portion extending from the lower end of either one of the front link and the rear link is connected to the nut so as to be rotatable about a nut side rotational axis,
wherein the lower bearing portion is connected to the base portion so as to be rotatable about a bearing portion side rotational axis,
wherein the nut side rotational axis and the bearing portion side rotational axis are parallel with rotational axes of the front link and the rear link,
wherein the lower arm mechanism has a lateral link including both ends rotatably connected to an upper end of the front link and an upper end of the rear link, respectively,
wherein the upper arm mechanism is connected to the lateral link so as to be rotatable about an upper arm rotational axis,
wherein the arm drive unit has an upper arm drive mechanism for driving the upper arm mechanism,
wherein the upper arm drive mechanism has an upper ball screw including a nut and a shaft, and an upper bearing portion supporting the shaft of the upper ball screw so as to be rotatable about its axis,
wherein the upper arm mechanism is connected to the nut of the upper ball screw at a position different from the upper arm rotational axis so as to be rotatable about a nut side rotational axis,
wherein the upper bearing portion is connected to the lateral link so as to be rotatable about a bearing portion side rotational axis, and
wherein the nut side rotational axis and the bearing portion side rotational axis of the upper ball screw are parallel with the upper arm rotational axis.

2. The industrial robot according to claim 1, wherein the extending portion extends downward from the lower end of either one of the front link and the rear link.

3. The industrial robot according to claim 1, wherein the bearing portion side rotational axis is positioned closer to the lower end of either one of the front link and the rear link than the lower end of the other one of the front link and the rear link.

4. The industrial robot according to claim 3, wherein the bearing portion side rotational axis is positioned near the lower end of either one of the front link and the rear link.

5. The industrial robot according to claim 1, wherein the bearing portion side rotational axis is positioned lower than a rotational axis of the lower end of either one of the front link and the rear link.

6. The industrial robot according to claim 1,
wherein the lower arm drive mechanism has a ball screw drive portion for rotatively driving the shaft of the lower ball screw about its axis, and
wherein the ball screw drive portion has a pair of drive motors for applying a power to a common rotary shaft.

7. The industrial robot according to claim 1, wherein the bearing portion side rotational axis of the upper ball screw is positioned in an extending portion extending rearward from a rear end of the lateral link.

8. The industrial robot according to claim 1,
wherein the upper arm drive mechanism has an upper ball screw drive portion for rotatively driving the shaft of the upper ball screw about its axis, and
wherein the upper ball screw drive portion has a pair of drive motors for applying a power to a common rotary shaft.

* * * * *